(12) United States Patent
Christoff, III

(10) Patent No.: US 11,739,877 B2
(45) Date of Patent: Aug. 29, 2023

(54) APPARATUS FOR USE WITH A VEHICLE COMPONENT VENTING SYSTEM

(71) Applicant: Robert N Christoff, III, Marysville, MI (US)

(72) Inventor: Robert N Christoff, III, Marysville, MI (US)

(73) Assignee: FCA US LLC, Auburn Hills, MI (US)

( * ) Notice: Subject to any disclaimer, the term of this patent is extended or adjusted under 35 U.S.C. 154(b) by 479 days.

(21) Appl. No.: 16/793,736

(22) Filed: Feb. 18, 2020

(65) Prior Publication Data

US 2021/0254734 A1 Aug. 19, 2021

(51) Int. Cl.
*F16L 55/027* (2006.01)
*F16H 57/027* (2012.01)

(52) U.S. Cl.
CPC ...... *F16L 55/02736* (2013.01); *F16H 57/027* (2013.01)

(58) Field of Classification Search
CPC .......... B60K 2015/03059; B60T 11/30; B65D 51/1611; F16D 2125/16; F16H 57/027; F16K 24/04; Y10T 137/3084; Y10T 137/3185
USPC ........... 138/42; 220/368, 371, 372, 373, 374
See application file for complete search history.

(56) References Cited

U.S. PATENT DOCUMENTS

| | | | | |
|---|---|---|---|---|
| 196,349 A * | 10/1877 | Ginss | ................. | F16L 55/027 138/40 |
| 649,779 A * | 5/1900 | Tyler | ................. | F16L 55/027 138/40 |
| 1,047,517 A * | 12/1912 | Harris | ................. | B65D 83/70 220/374 |
| 1,426,501 A * | 8/1922 | Parizek | ................. | B65D 39/08 220/374 |
| 1,841,691 A * | 1/1932 | Wilson | ................. | B60K 15/0406 55/509 |
| 2,739,731 A * | 3/1956 | Hautzenroeder | .. | B60K 15/0406 55/447 |
| 3,072,284 A * | 1/1963 | Luhmanjr | ................. | F16K 17/19 429/82 |
| 3,422,982 A * | 1/1969 | Myers | ................. | F16H 57/027 220/374 |

(Continued)

FOREIGN PATENT DOCUMENTS

DE 102019203717 A1 * 9/2020

*Primary Examiner* — Robert K Arundale
*Assistant Examiner* — Richard K. Durden
(74) *Attorney, Agent, or Firm* — Jeremy J. Klobucar

(57) ABSTRACT

An apparatus for a vehicle component venting system comprises a body having an inlet, an outlet, and a fluid pathway(s) therebetween through which air may pass, and a shield between the inlet and outlet configured to block liquid from passing from the inlet to the outlet. The inlet includes a first set of ports extending from an interior surface of the body through an exterior surface; and the shield and interior surface of the body define a void therebetween. A second set of ports extends through the shield and are in fluid communication with the void and a passageway extending between the shield and the outlet, the first and second sets of ports, the void, and the passageway form the fluid pathway between the inlet and outlet. The ports of the second set of ports are offset from and linearly misaligned with the ports of the first set of ports.

18 Claims, 5 Drawing Sheets

(56) References Cited

U.S. PATENT DOCUMENTS

| | | | | |
|---|---|---|---|---|
| 3,537,543 | A * | 11/1970 | Gibel | B30B 15/32 |
| | | | | 138/44 |
| 3,709,246 | A * | 1/1973 | Kachergis | F16K 47/02 |
| | | | | 137/449 |
| 3,727,638 | A * | 4/1973 | Zaremba, Jr. | F01M 11/0408 |
| | | | | 251/351 |
| 3,931,455 | A * | 1/1976 | Burnell | H02G 15/26 |
| | | | | 454/367 |
| 3,951,171 | A * | 4/1976 | Gibel | F01N 1/08 |
| | | | | 138/42 |
| 4,103,492 | A * | 8/1978 | Sakazume | B60T 11/22 |
| | | | | 137/574 |
| 4,351,203 | A * | 9/1982 | Fukunaga | F16H 57/0483 |
| | | | | 74/606 R |
| 4,595,118 | A * | 6/1986 | Azuma | F16H 57/027 |
| | | | | 74/606 R |
| 5,348,570 | A * | 9/1994 | Ruppert, Jr. | F16H 57/027 |
| | | | | 55/504 |
| 5,447,214 | A * | 9/1995 | Appelgren | F15B 21/044 |
| | | | | 188/352 |
| 6,166,327 | A * | 12/2000 | Saito | H02G 3/088 |
| | | | | 220/374 |
| 10,386,003 | B2 * | 8/2019 | Kerr | F16L 55/02781 |
| 2005/0121642 | A1 * | 6/2005 | Purdy | B60T 17/222 |
| | | | | 251/343 |
| 2011/0173935 | A1 * | 7/2011 | Tesner | F16H 57/027 |
| | | | | 55/385.3 |
| 2019/0031166 | A1 * | 1/2019 | Blackwell | B60T 11/30 |
| 2020/0023433 | A1 * | 1/2020 | Lewis | B22F 5/106 |

\* cited by examiner

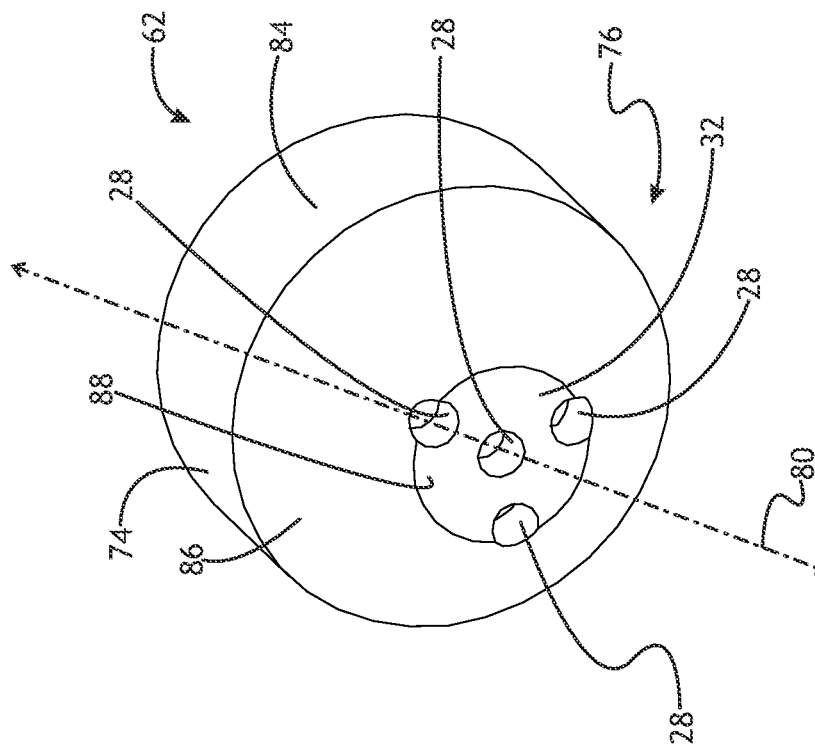
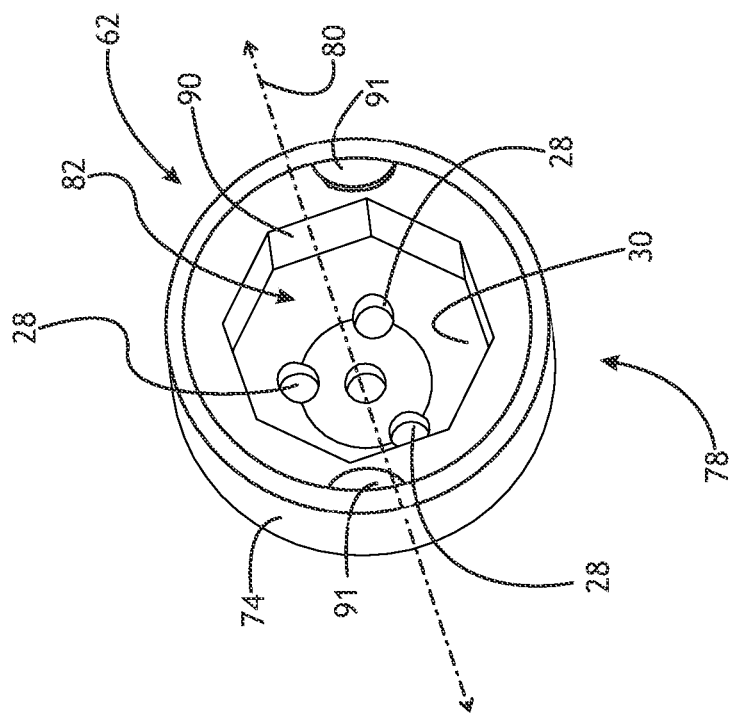

APPARATUS FOR USE WITH A VEHICLE COMPONENT VENTING SYSTEM

FIELD

The present disclosure relates to an apparatus for use with a venting system for a vehicle component such as, for example, a powertrain component.

BACKGROUND

To alleviate the build-up of pressure in certain vehicle components, those components are often vented using a venting system. While various types of venting system may be used, in certain instances it may be desirable to use a membrane fabric-style venting system, for example, a Gore-Tex fabric venting system. Such a venting system has a membrane that prevents water from reaching a vented component through the venting system, yet also allows air from the component to pass through the membrane to vent the component. One benefit of a membrane fabric-type venting system is that it may be fully submerged in water and still vent a component.

One drawback of membrane fabric-style venting systems, however, is that if oil from the vented component contacts the membrane, the membrane may fail. If the membrane fails, water may be allowed to pass through the membrane and into the component, which may lead to component failure as a result of the mixing of oil and water. To prevent oil from reaching the membrane, membrane fabric-style venting systems are often used in conjunction with a labyrinth that is intended to prevent oil from reaching the membrane. Such labyrinths are most common with components having a cast housing where the labyrinth is cast into the housing itself.

For powertrain components, such as, for example, beam axles formed of swaged tubes, however, membrane fabric-style venting systems have not been used because it has proved difficult, due at least in part to component clearances, to manufacture a labyrinth into the swaged axle tube. Instead, beam axles are typically coupled to venting systems through vent hoses. The use of vent hoses, however, presents a number of drawbacks.

For example, vent hoses cause packaging issues due to the required routing of the hose between the component being vented and the venting system. More specifically, the hose has to be routed carefully though the suspension and exhaust areas of the vehicle, which may cause additional expense to ensure that the vent tube is routed securely and free from collision with other vehicle components. Additionally, vent hoses may fracture or become disconnected from the component or the venting system due to, for example, flexing and stress on the hose caused by, for example, environmental conditions. Regardless of the cause, the fracture or disconnection of the hose may allow water and debris to enter the component and mix with oil/lubricant in the component, potentially resulting in component failure.

SUMMARY

In at least some implementations, an apparatus for use with a venting system for a vehicle component comprises a body having an inlet, an outlet, and a longitudinal axis extending therebetween. The body further includes one or more fluid pathways extending between the inlet and the outlet through which air is permitted to pass, and an internal shield disposed between and spaced apart from both the inlet and the outlet and configured to block liquid from passing from the inlet to the outlet. The inlet includes a first set of one or more fluid ports extending axially from an interior surface of the body through an exterior surface of the body, and a surface of the shield and the interior surface of the body define a void between the shield and the first set of one or more fluid ports. The body further includes a second set of one or more fluid ports extending through the internal shield and in fluid communication with both the void in the body and a fluid passageway extending between the internal shield and the outlet of the body, the ports of the first set of one or more ports, the void, the ports of the second set of one or more ports, and the fluid passageway forming the one or more fluid pathways of the body extending between the inlet and outlet. Additionally, the ports of the second set of one or more fluid ports are offset from and linearly misaligned with the ports of first set of one or more ports.

In at least some implementations, an apparatus for use with a venting system for a vehicle component comprises a body having an inlet, an outlet, and a longitudinal axis extending therebetween. The body further includes one or more fluid pathways extending between the inlet and the outlet through which air is permitted to pass, and an internal shield disposed between and spaced apart from the inlet and the outlet and configured to block liquid from passing from the inlet to the outlet. The body comprises a frustoconical portion and the inlet includes a first set of one or more fluid ports extending axially from an interior surface of the frustoconical portion through an exterior surface of the frustoconical portion, and a surface of the shield and the interior surface of the frustoconical portion define a void between the shield and the first set of one or more fluid ports. The body further includes a second set of one or more fluid ports extending through the internal shield and in fluid communication with both the void in the body and a fluid passageway extending between the internal shield and the outlet of the body, the ports of the first set of one or more ports, the void, the ports of the second set of one or more ports, and the fluid passageway forming the one or more fluid pathways of the body extending between the inlet and outlet. Additionally, the ports of the second set of one or more fluid ports are offset from the ports of first set of one or more ports and oriented at non-zero angles relative to the longitudinal axis of the body.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIGS. 6-7b are isometric views of embodiments of various members forming the apparatus illustrated in in FIG. 5.

DETAILED DESCRIPTION

Figure 1:
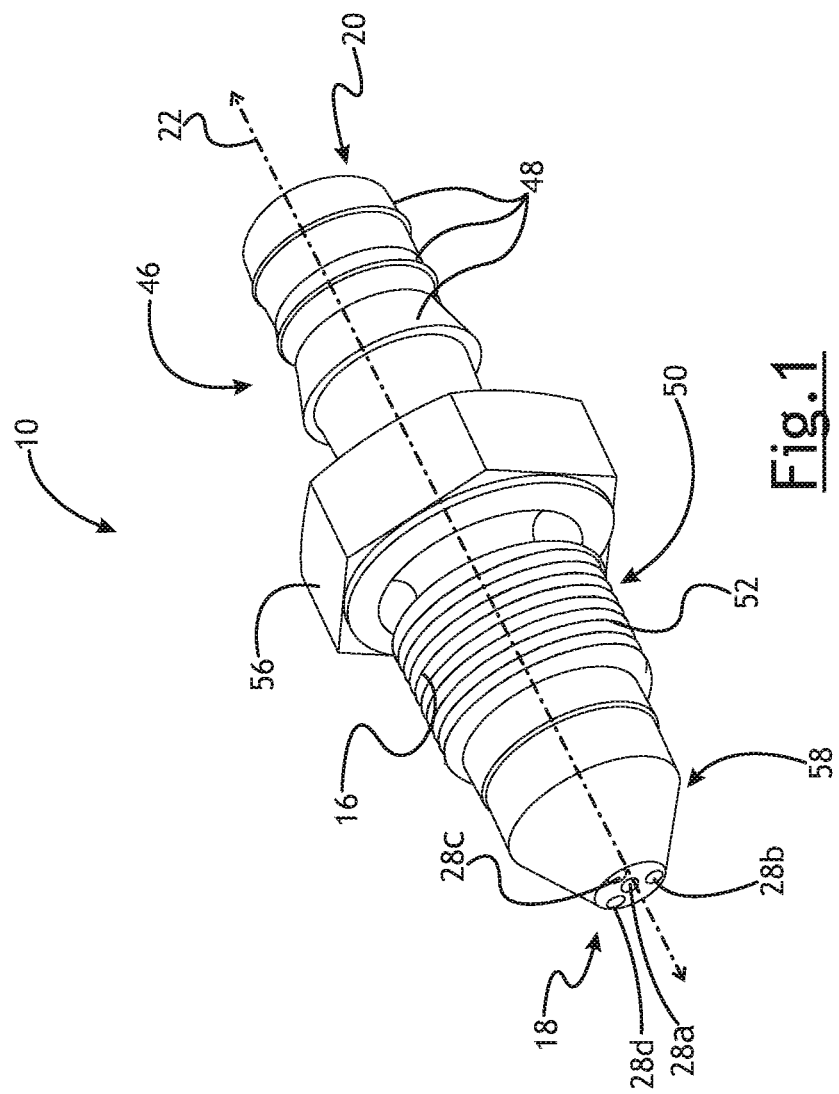
FIG. 1 is an isometric view of an illustrative embodiment of an apparatus for use with a venting system for a vehicle component.
Figure 2:
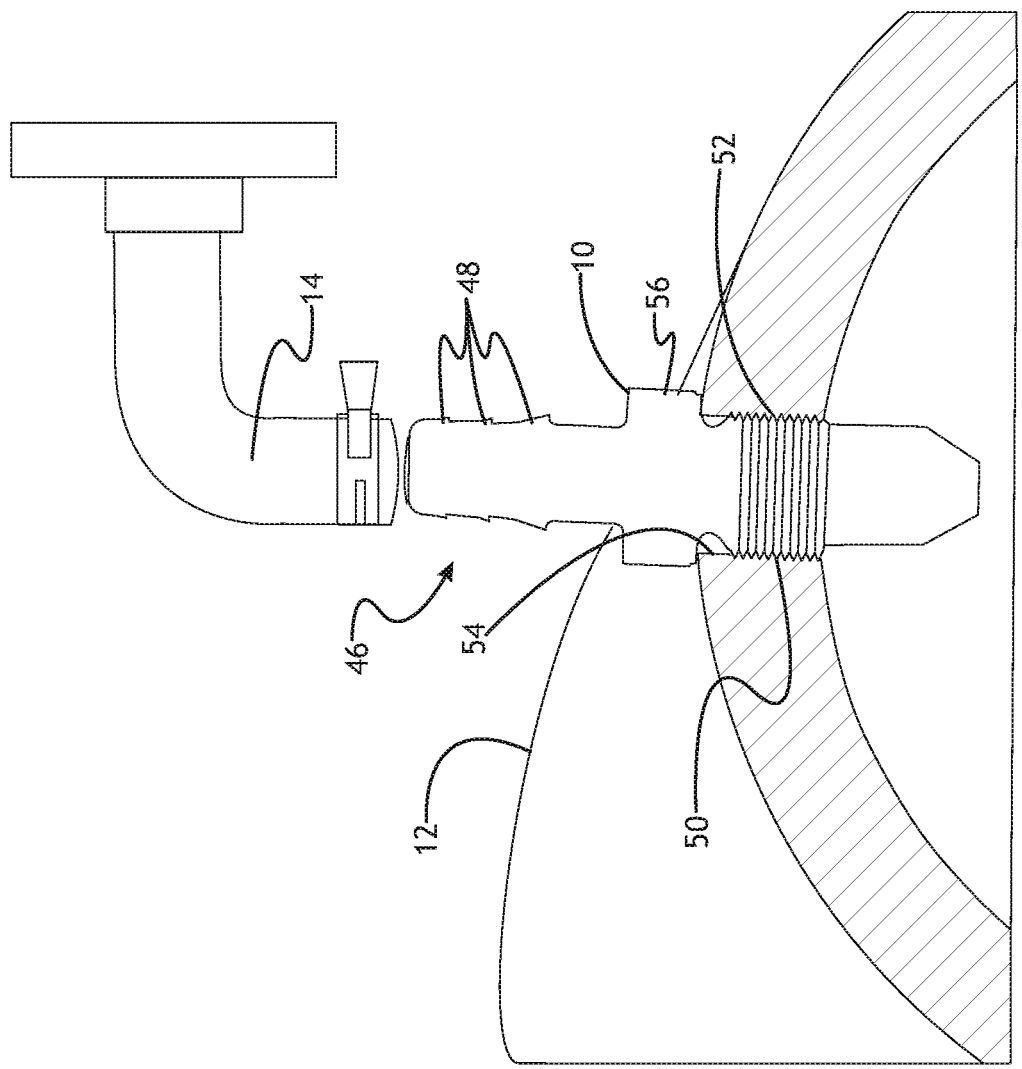
FIG. 2 is an isometric and diagrammatic view of an assembly comprising the apparatus illustrated in FIG. 1, a vehicle component, and a venting system for the vehicle component.

Referring in more detail to the drawings, FIG. 1 depicts an illustrative embodiment of an apparatus 10 for use with a venting system for a vehicle component. More particularly, and as shown in FIG. 2, the apparatus 10 is configured to facilitate the coupling of a vehicle component 12 with a venting system 14 and, in general terms, to create a tortuous path therein through which air but not liquid is intended to pass. In an embodiment, the apparatus 10 is intended for use with a membrane fabric-style venting system and a powertrain component of a vehicle, for example, a beam axle. It will be appreciated, however, that the apparatus 10 may find application with venting systems other than membrane fabric-style venting systems, and/or vehicle components other than powertrain components. Accordingly, the present disclosure is not intended to be limited to any particular venting systems and/or vehicle components.

Figure 3:
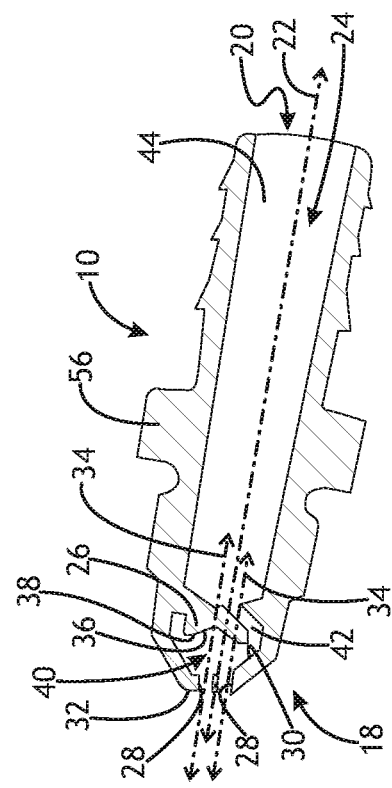
FIG. 3 is a cross-sectional view of the apparatus illustrated in FIG. 1.

With particular reference to FIGS. 1 and 3, the apparatus 10 includes a body 16 having an inlet 18, an outlet 20, and a longitudinal axis 22 extending therebetween. In an embodiment, the axis 22 is oriented such that it is substantially parallel to the force vector of gravity. For purposes of this disclosure, "substantially parallel" means exactly parallel or within a predetermined number of degrees of parallel, for example and without limitation, 0-45° of parallel. It will be appreciated, however, that "substantially parallel" may include any number of suitable angles or range of angles of parallel, and thus, the present disclosure is not intended to be limited to any particular angle or range of angles.

The body further includes one or more fluid pathways 24 extending between the inlet 18 and outlet 20 through which air is permitted to pass, and an internal shield 26 disposed between and spaced apart from both the inlet 18 and the outlet 20 and configured to block liquid entering the body 16 through the inlet 18 from passing to the outlet 20. As shown in FIG. 3, in an embodiment the shield 26 is spaced from the outlet 20 in the direction of the force vector of gravity, and from the inlet 18 in a direction opposite the direction of the force vector of gravity.

As best shown in FIG. 3, the inlet 18 includes a first set of one or more ports 28 extending axially relative to the longitudinal axis 22 from an interior surface 30 of the body 16 through an exterior surface 32 of the body 16. The port(s) 28 are configured to permit fluid (e.g., air and liquid) to pass from the vehicle component 12 into the body 16 of the apparatus 10, and from inside the body 16 of the apparatus 10 back into the component 12 in the direction of the force vector of gravity. The first set of one or more ports comprises a plurality of ports 28 with one port 28a being coaxial with the longitudinal axis 22 of the body 16 and the other ports 28b-28d being radially spaced from and circumferentially spaced about the longitudinal axis 22. In other embodiments, however, the ports 28 may have a different arrangement (e.g., the ports may not include a port that is coaxial with the longitudinal axis of the body or circumferentially-spaced ports), and thus, the present disclosure is not intended to be limited to any particular arrangement. In any event, in an embodiment, each of the ports 28 extends along a respective axis 34 that intersects the shield 26 such that the shield 26 overlaps the ports 28. As shown in FIG. 3, in at least some embodiments, the shield 26 includes a recess 36 that is axially aligned with the inlet 18 and that extends in an axial direction away from the inlet 18 and toward the outlet 20. In such an embodiment, the axes 34 along which the ports 28 extend intersect the recess 36 such that the recess 36 overlaps the ports 28.

As best shown in FIG. 3, the shield 26 has a surface 38 facing in an axial direction toward the inlet 18 and interior surface 30 of the body 16. The shield surface 38 and the interior surface 30 combine to define a void 40 in the body 16 between the shield 26 and the first set of one or more ports 28. As briefly described above, the shield 26 is configured to block liquid from passing from the inlet 18 to the outlet 20. More specifically, the shield 26, and the surface 38 thereof, in particular, is configured to block oil/lubricant that enters the apparatus 10 through the port(s) 28 from ultimately passing through the pathways(s) 24 in the body 16 to the venting system 14. Instead, the shield 26 repels oil or other liquid entering the apparatus 10 through the port(s) 28 back into the void 40 and towards the port(s) 28 in the direction of the force vector of gravity where the fluid/liquid, under the force of gravity, may pass back into the component 12 through the port(s) 28.

While the shield 26 blocks fluid, it allows air to pass from the inlet 18 to the outlet 20. More specifically, as shown in FIG. 3, a second set of one or more fluid ports 42 are disposed in and extend through the internal shield 26. The port(s) 42, which may be radially spaced from and circumferentially spaced about the axis 22, are in fluid communication with both the void 40 in the body 16 and a fluid passageway 44 extending between the internal shield 26 and the outlet 20 of the body 16. The port(s) 28 of the first set of one or more ports, the void 40, the port(s) 42 of the second set of one or more ports, and the fluid passageway 44 combine to form the one or more fluid pathways 24 of the body 16 extending between the inlet 18 and outlet 20. However, the ports 42 of the second set of one or more ports are arranged and oriented in such a way that there is not a direct path for fluid to flow or pass from the port(s) 28 of the first set of one or more ports to the passageway 44, and thus, the vent system 14.

Figure 4:
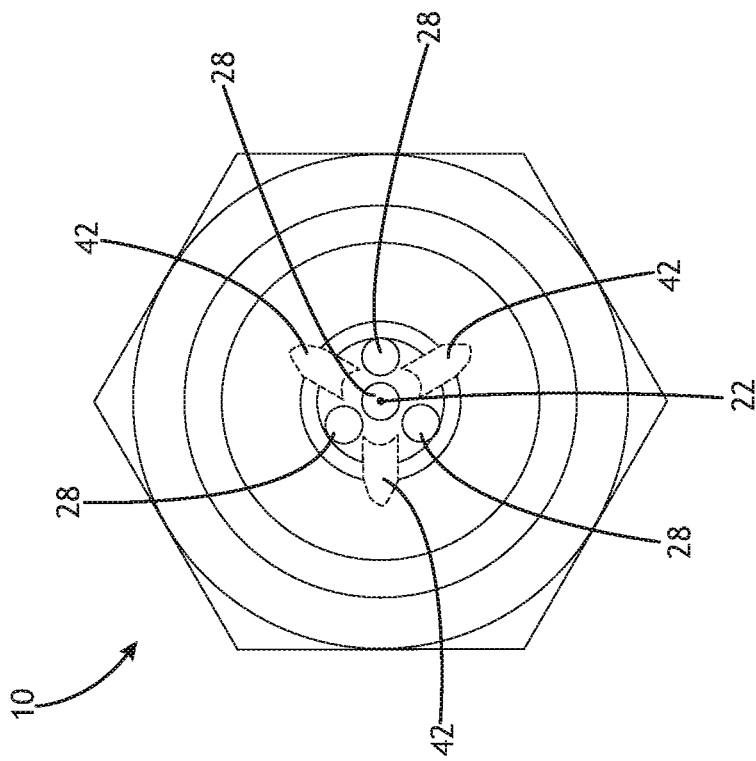
FIG. 4 is a plan view of an end of the apparatus illustrated in FIG. 1.

More specifically, in an embodiment such as that illustrated in FIGS. 3 and 4, the port(s) 42 of the second set of one or more ports are offset from and linearly misaligned with the port(s) 28 of the first set of one or more ports. For example, in an embodiment, the port(s) 42 are oriented at non-zero angles relative to both the longitudinal axis 22 of the body 16 and the axes 34 along which the ports 28 extend. The port(s) 28 of the first set of one or more ports, the port(s) 42 of the second set of one or more ports, and the void 40 combine to form a labyrinth through which air may pass from the component 12 to the venting system 14 and vice versa. In other words, the first and second sets of ports are separated by the void and shield to create a tortuous path for fluids, allowing air to pass but capturing liquid that is drained back into the component under the force of gravity.

As briefly described above, the apparatus 10 is configured to facilitate the coupling of the vehicle component 12 with the venting system 14. As such, in an embodiment such as that illustrated in FIG. 1, a first portion 46 of the body 16 adjacent the outlet 20 includes an attachment feature 48 configured to couple the body 16 to a component of the venting system 14. This attachment feature may take any number of forms. In one embodiment, the attachment feature 48 may comprise one or more threads configured to be mated with a complementary threaded portion of the venting system component with which it is to be coupled. For example, the attachment feature may comprise one or more threads configured to be mated with a complementary threaded portion of a vent nipple of the venting system 12.

In another embodiment such as that illustrated in FIGS. 1 and 2, the attachment feature 48 may comprise one or more barbs configured to engage a surface (e.g., inner surface) of the component of the venting system 14 when the barbed portion 46 of the body 16 is inserted into an opening in the venting system component, thereby creating a mechanical fit between the apparatus 10 and the component of the venting system 14. For example, in the embodiment illustrated in FIG. 2, the apparatus 10 may include an integrated vent nipple that is configured to be coupled with a vent tube of the venting system 14. In such an embodiment, the attachment feature 48 may comprise one or more barbs configured to engage an inner surface of the vent tube when the barbed portion 46 of the body 16 is inserted into an end of the vent tube.

Similar to the above, a second portion 50 of the body 16 adjacent the inlet 18 may include an attachment feature 52 configured to couple the body 16 to the vehicle component 12. As with the attachment feature 48 described above, the attachment feature 52 may take any number of forms. In one embodiment such as that illustrated in FIGS. 1 and 2, the attachment feature 52 may comprise one or more threads configured to be mated with a complementary threaded portion of the component 12 to which it is to be coupled. For example, and as shown in FIG. 3, the attachment feature 52 may comprise one or more threads configured to be mated with a complementary threaded aperture 54 in the component 12. More specifically, the end of the body 16 at which the inlet 18 is disposed may be inserted into the threaded aperture 54 and the threads of the engagement feature 52 adjacent the inlet 18 may be mated with the threads of the aperture 54 to couple the apparatus 10 with the component 12.

While particular examples of engagement features have been described above, it will be appreciated that other engagement features may be used instead, and thus, the present disclosure is not intended to be limited to any particular type of engagement feature but rather any suitable feature may be used.

In addition to the above, the body 16 may additionally or alternatively comprise a grip feature 56 that allows the body 16 to be manipulated (e.g., rotated) when, for example, mating one or both of the engagement features 48, 52 of the body 16 with a complementary engagement feature of a venting system component or the vehicle component 12. In an embodiment, the grip feature 56 is located between the engagement features 48, 52. It may also be configured to be gripped by a tool, and thus, may have a cross-sectional shape suitable for engagement with the tool (e.g., a hexagonal cross-sectional shape). In any event, the grip feature 56 may be engaged and used to couple the apparatus 10 with another component.

In an embodiment such as that illustrated in FIGS. 1-3, the body 16 includes a frustoconical portion 58 at the end of the body 16 proximate the inlet 18, and the port(s) 28 of the first set of one or more ports comprising the inlet 18 may be disposed in the frustoconical portion 58. In such an embodiment, the frustoconical portion 58 may taper as it extends toward the inlet 18 of the body 16 and away from the outlet 20. The frustoconical portion 58 is sized and shaped to be inserted into an aperture in the vehicle component 12 (e.g., the aperture 54 in FIG. 2), and is intended to repel liquid inside the component 12 to prevent or at least limit the amount of liquid that may enter the apparatus 10 through the port(s) 28. The frustoconical portion 58 may also include a recess (e.g., recess 88 illustrated in FIG. 7b) within which the port(s) 28 are disposed to further prevent or limit the amount of liquid that may enter the apparatus 10 through the port(s) 28.

In the embodiment illustrated in FIGS. 1 and 3, the apparatus 10, and the body 16 thereof, in particular, is of a unitary construction. In other embodiments, however, the apparatus 10 may be comprised of multiple pieces or members that when assembled or coupled together, form the body 16. In either instance, the body 16 may be formed of any number of suitable materials, for example and without limitation, metal (e.g., brass) and/or a molded plastic material.

FIGS. 5-7b illustrate an embodiment of the apparatus 10 (apparatus 110) in which the body 16 (body 116) is formed of multiple members. Except as otherwise described below, the description above of the apparatus 10 and the body 16 thereof applies here with equal weight, and as such, the description above is incorporated here by reference and will not be repeated in its entirety.

In an illustrative embodiment, the apparatus 110 comprises a first member 60 and a second member 62 configured to be coupled together to form the body 116 of the apparatus 110. In such an embodiment, the first member 60 may be configured to be coupled with a component of the venting system 14, for example, a vent nipple or a vent tube, and the second member 62 may be configured to be coupled with the component 12 being vented.

Figure 6:
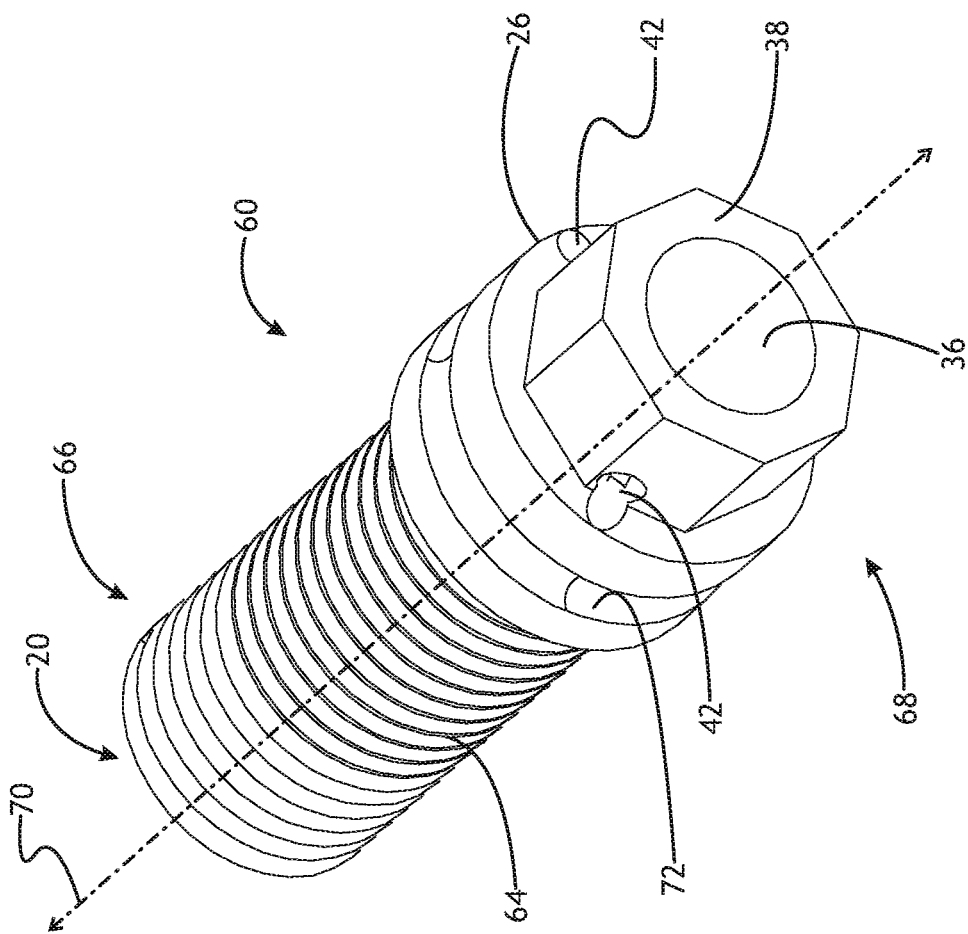

In the embodiment illustrated in FIG. 6, the first member 60 includes the outlet 20 and the internal shield 26 of the body 116. More specifically, the first member 60 includes a body 64 having a first end 66, a second end 68 opposite the first end 66, and a longitudinal axis 70 extending therebetween. The outlet 20 is disposed at the first end 66 of the body 116 and the shield 26 is disposed at the second end 68 of the body 116. The port(s) 42 of the second set of one or more ports extend through the internal shield 26, and are in fluid communication with the fluid passageway 44 extending between the internal shield 26 and the outlet 20, which allows air to pass or flow through the body 64 of the first member 60. As also described above, and as will be described in greater detail below, the shield 26 may also include a recess 36 therein extending axially toward the first end 66 of the body 64 and away from the second end 68.

In addition to the above, the first member 60 may also include a coupling feature 72 that is configured to be mated with a complementary coupling feature of the second member 62 to couple the first and second members 60, 62 together.

In an embodiment, the coupling feature 72 includes one or more radially outwardly-extending projections configured to be received by one or more complementary grooves in the second member 62. In such an embodiment, the coupling feature 72 may include a single projection that extends along the entire circumference of the body 64. In other embodiments, the coupling feature 72 may include multiple projections spaced from each other along the circumference of the body.

In still other embodiments, such as, for example, that illustrated in FIG. 6, the coupling feature 72 includes one or more grooves configured to receive one or more projections 91 of the second member 62. As with the embodiment described above, the coupling feature 72 may include a single groove that extends along the entire circumference of the body 64, while in other embodiments the coupling feature 72 may include multiple grooves spaced from each other along the circumference of the body.

Regardless of whether the coupling feature 72 comprises a projection or a groove and as will be described in greater detail below, in an embodiment the first and second members 60, 62 are configured to be snap-fit together to form the body 116 of the apparatus 110. It will be appreciated that while particular coupling features have been described above, other suitable coupling features may certainly be used and thus the present disclosure is not intended to be limited to any particular type(s) of coupling features.

As briefly described above, the first member 60 may be configured to be coupled with a component of the venting system 14, for example, a vent nipple or a vent tube. In one embodiment, the body 64 may include a threaded portion that is configured to be mated with a complementary threaded portion of a vent nipple. In other embodiments, however, the body 64 may be coupled with the vent nipple in other ways, for example, with epoxy, via a friction weld, via brazing, or in any other suitable way known in the art.

As shown in FIGS. 7a and 7b, in an embodiment, the second member 62 includes the inlet 18 of the body 116, the interior surface 30 of the body 116 that defines the void 40 in the body 116, and the exterior surface 32 through which the port(s) 28 of the first set of one or more ports comprising the inlet 18 extend. More specifically, the second member 62 may include a body 74 having a closed end 76, an open end 78 opposite the first or closed end 76, and a longitudinal axis 80 extending therebetween. The body 74 further includes the interior surface 30 that defines a cavity 82 of the second member 62. The body further includes the inlet 18, and the port(s) 28 comprising the inlet 18 are disposed at the closed end 76 of the body 116 and extend through both the interior surface 30 and the exterior surface 32 of the body 74. In an embodiment, the open end 76 and the cavity 82 are both sized and shaped to receive a portion of the body 64 of the first member 60, and more particularly, at least a portion of the second end 68 of the body 64 that includes the shield 26.

Figure 5:
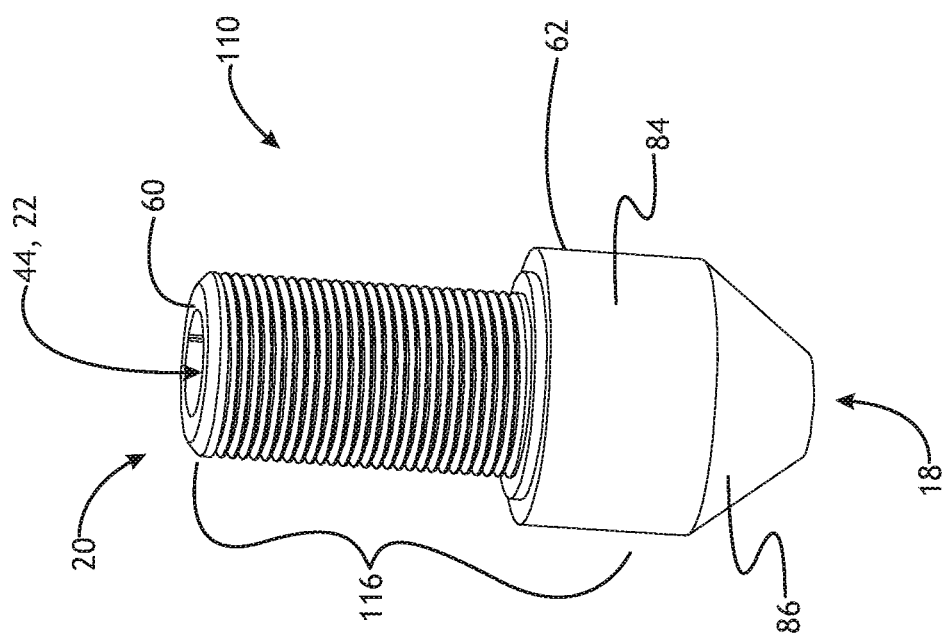
FIG. 5 is an isometric view of another embodiment of an apparatus for use with a venting system for a vehicle component.

In the embodiment illustrated in FIGS. 5 and 7b, a first portion 84 of the body 74 at the open end 78 thereof has a cylindrical shape and a second portion 86 of the body 74 at the closed end 76 has a frustoconical shape that tapers as the body 74 extends away from the cylindrically-shaped portion 84. In an embodiment wherein the second portion 86 of the body 74 has a frustoconical shape, the inlet 18 is disposed in the frustoconically-shaped portion 86, and in at least some embodiments wherein the frustoconically-shaped portion 86 includes a recess 88 (as described above), the inlet 18 is disposed in the recess 88, as is shown in FIG. 7b.

As with the first member 60, the second member 62 may further include a coupling feature 90 that is configured to be mated with a complementary coupling feature of the first member 60 (e.g., coupling feature 72) to couple the first and second members 60, 62 together.

In an embodiment such as that illustrated in FIG. 7a, the coupling feature 90 includes one or more radially inwardly-extending projections 91 configured to be received by one or more complementary grooves in the first member 60. In such an embodiment, the coupling feature 90 may include a single projection that extends along the entire circumference of the body 74. In other embodiments, the coupling feature 90 may include multiple projections spaced from each other along the circumference of the body 74.

In still other embodiments, the coupling feature 90 includes one or more grooves configured to receive one or more projections of the first member 60. In such an embodiment, and as with the embodiment described above, the coupling feature 90 may include a single groove that extends along the entire circumference of the body 74, while in other embodiments the coupling feature 90 may include multiple grooves spaced from each other along the circumference of the body 74.

As with the coupling feature 72 described above, regardless of whether the coupling feature 90 comprises a projection or a groove, in an embodiment the first and second members 60, 62 are configured to be snap-fit together to form the body 116 of the apparatus 110. More specifically, a portion of the first member 60 may be inserted into the open end 78 and cavity 82 of the body 74 of the second member 62, and the first and second members may be snapped together.

It will be appreciated that while particular coupling features have been described above, other suitable coupling features may certainly be used and thus the present disclosure is not intended to be limited to any particular type(s) of coupling features.

When the first and second members 60, 62 are coupled together to form the body 116 of the apparatus 110, the interior surface 30 of the second member 62 and the axially-facing surface 38 of the shield 26 of the first member 60 define the void 40 in the body 116 between the shield 26 and the port(s) 28 of the first set of one or more ports that comprise the inlet 18 of the body 116. The combination of the port(s) 28 of the first set of one or more ports, the void 40, the port(s) 42 of the second set of one or more ports in the shield 26, and the fluid passageway 44 extending from the outlet 20 of the body 116 to the shield 26 combine to form the one or more fluid pathways 24 in the body 116 that extend from the inlet 18 to the outlet 20. And the port(s) 28 of the first set of one or more ports, the port(s) 42 of the second set of one or more ports, and the void 40 combine to define a labyrinth in the body 116 through which air may pass from the component 12 to the venting system 14 and vice versa. The shield includes the axially facing end surface 38, the recess 36 formed in the end surface 38 and extending axially away from the end surface so that the shield is concave as viewed from the inlet, and an axial portion extending axially away from the axially facing end surface 38, and wherein the second set of fluid ports 42 are axially spaced from the axially facing end surface 38 and extend through said axial portion to communicate with the fluid passageway 44, and the second set of fluid ports 42 are open to the void 40 at a location radially outward of the recess 36, as shown in the embodiments in FIGS. 3 and 6. Thus, the shield 26 includes the recess 36 that is concave as viewed from the inlet 18 and wherein the second set of fluid ports 42 each have an end that is open to the void 40 and that is located radially outward of the recess 36, as shown in the embodiments in FIGS. 3 and 6.

As was described elsewhere above, when the first and second members 60, 62 are coupled together, the axes 34 along which the port(s) 28 of the first set of one or more ports extend may intersect the shield 26 such that the shield 26 overlaps the port(s) 28. Further, in an embodiment wherein the shield 26 includes the recess 36, the axes 34 along which at least some of the port(s) 28 of the first set of one or more ports extend intersect the recess 36.

What is claimed is:

1. An apparatus for use with a venting system for a vehicle component, comprising a body having:
   an inlet, an outlet, and a longitudinal axis extending therebetween, wherein, in use, the inlet is below the outlet in the direction of the force vector of gravity; and
   a shield disposed between and spaced apart from both the inlet and the outlet and configured to block liquid from passing from the inlet to the outlet, wherein:
   the inlet includes a first set of fluid ports extending axially from an interior surface of the body through an exterior surface of the body, wherein the first set of fluid ports includes a plurality of fluid ports,
   an axially facing end surface of the shield and the interior surface of the body define a void between the shield and the first set of fluid ports, and
   the body includes a second set of fluid ports extending through the shield and in fluid communication with both the void in the body and a fluid passageway extending between the shield and the outlet of the body, wherein the second set of fluid ports includes a plurality of fluid ports and wherein the first set of fluid ports, the void, the second set of fluid ports, and the fluid passageway combine to form one or more fluid pathways of the body extending between the inlet and outlet, and further wherein the ports of the second set of fluid ports are offset from and linearly misaligned with the ports of the first set of fluid ports, and wherein the shield includes a recess formed in the axially facing end surface and extending axially away from the axially facing end surface so that the shield is concave as viewed from the inlet, and an axial portion extending axially away from the axially facing end surface, and wherein the second set of fluid ports are axially spaced from the axially facing end surface and extend through said axial portion to communicate with the fluid passageway, and the second set of fluid ports are open to the void at a location radially outward of the recess.

2. The apparatus of claim 1, wherein the ports of the first set of fluid ports are oriented along respective axes that intersect the shield.

3. The apparatus of claim 1, wherein a first portion of the body adjacent the outlet includes an attachment feature configured to couple the body to a component of the venting system.

4. The apparatus of claim 1, wherein the body comprises a frustoconical portion, and the ports of the first set of fluid ports are disposed in the frustoconical portion.

5. The apparatus of claim 1, wherein the recess extends axially away from the first set of fluid ports, and further wherein the ports of the first set fluid ports extend along respective axes that intersect the recess in the shield.

6. The apparatus of claim 1, wherein the body is comprised of a first member and a second member configured to be coupled together.

7. The apparatus of claim 6, wherein the first member includes the outlet, the second set of fluid ports and the shield of the body, and the second member includes the inlet of the body, and wherein the shield is disposed at an axial end of the first member that is opposite to the outlet.

8. The apparatus of claim 7, wherein the second member includes a frustoconical portion in which the ports of the first set of fluid ports are disposed.

9. The apparatus of claim 7, wherein the ports of the first set of fluid ports extend along respective axes that intersect the recess in the shield when the first and second members are coupled together.

10. The apparatus of claim 6, wherein the first member includes a first coupling feature and the second member includes a second coupling feature that is complementary with the first coupling feature, and further wherein the mating of the first and second coupling features couples the first and second members together.

11. An apparatus for use with a venting system for a vehicle component, comprising a body having:
    an inlet, an outlet, and a longitudinal axis extending therebetween;
    one or more fluid pathways extending between the inlet and the outlet through which air is permitted to pass, and
    an internal shield disposed between and spaced apart from both the inlet and the outlet and configured to block liquid from passing from the inlet to the outlet, wherein:
    the body comprises a frustoconical portion and the inlet includes a first set of fluid ports that includes multiple fluid ports disposed in the frustoconical portion and extending axially from an interior surface of the frustoconical portion through an exterior surface of the frustoconical portion,
    a surface of the shield and the interior surface of the body define a void between the shield and the first set of fluid ports, and
    the body includes a second set of fluid ports that includes multiple ports extending through the internal shield and in fluid communication with both the void in the body and a fluid passageway extending between the internal shield and the outlet of the body, wherein the ports of the first set of fluid ports, the void, the ports of the second set of fluid ports, and the fluid passageway combine to form the one or more fluid pathways of the body extending between the inlet and outlet, and further wherein the ports of the second set of fluid ports are offset from the ports of the first set of fluid ports and oriented at non-zero angles relative to the longitudinal axis of the body, and wherein the internal shield includes a recess that is concave as viewed from the inlet and wherein the second set of fluid ports each have an end that is open to the void and that is located radially outward of the recess.

12. The apparatus of claim 11, wherein a first portion of the body adjacent the outlet includes an attachment feature configured to couple the body to a component of the venting system.

13. The apparatus of claim 11, wherein the ports of the first set of fluid ports extend along respective axes that intersect the recess in the internal shield.

14. The apparatus of claim 11, wherein the body is of a unitary construction.

15. The apparatus of claim 11, wherein the body is comprised of a first member and a second member configured to be coupled together.

16. The apparatus of claim 15, wherein the first member includes the outlet and the internal shield of the body, and the second member includes the inlet of the body.

17. The apparatus of claim 16, wherein the ports of the first set of fluid ports extend along respective axes that intersect the recess in the internal shield when the first and second members are coupled together.

18. The apparatus of claim 15, wherein the first member includes a first coupling feature and the second member includes a second coupling feature that is complementary with the first coupling feature, and further wherein the mating of the first and second coupling features couples the first and second members together.

* * * * *